Feb. 6, 1962 T. CARVEL 3,019,744
ASSEMBLY AND STACKING APPARATUS
Filed Feb. 20, 1961 5 Sheets-Sheet 2
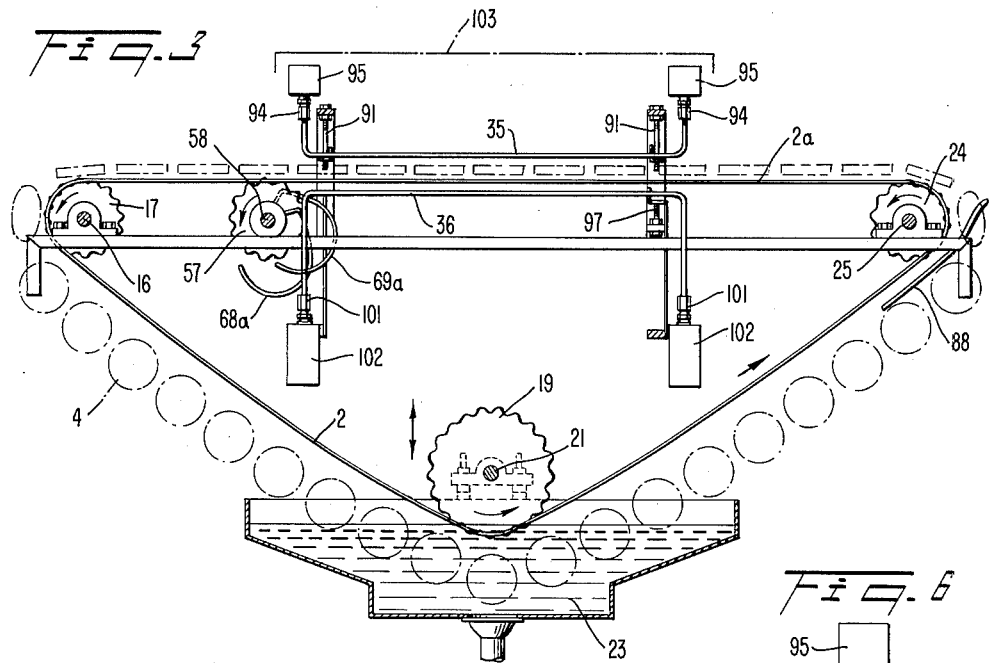
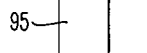
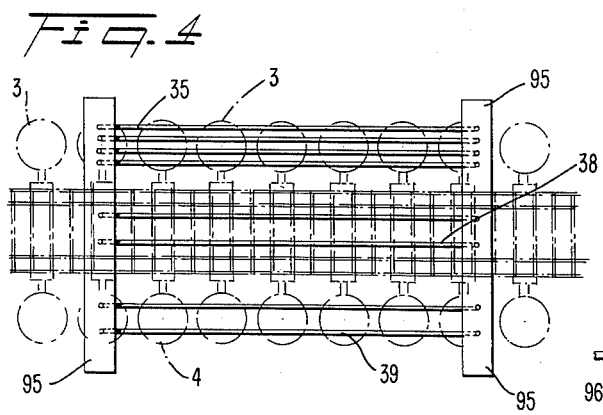
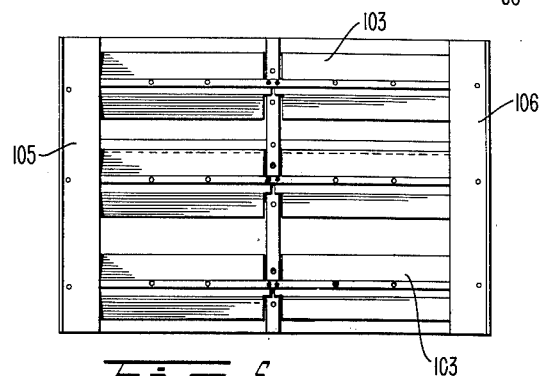
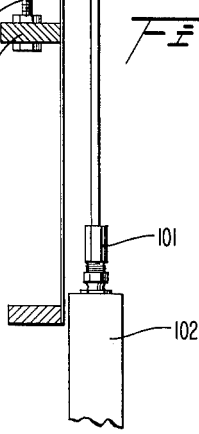

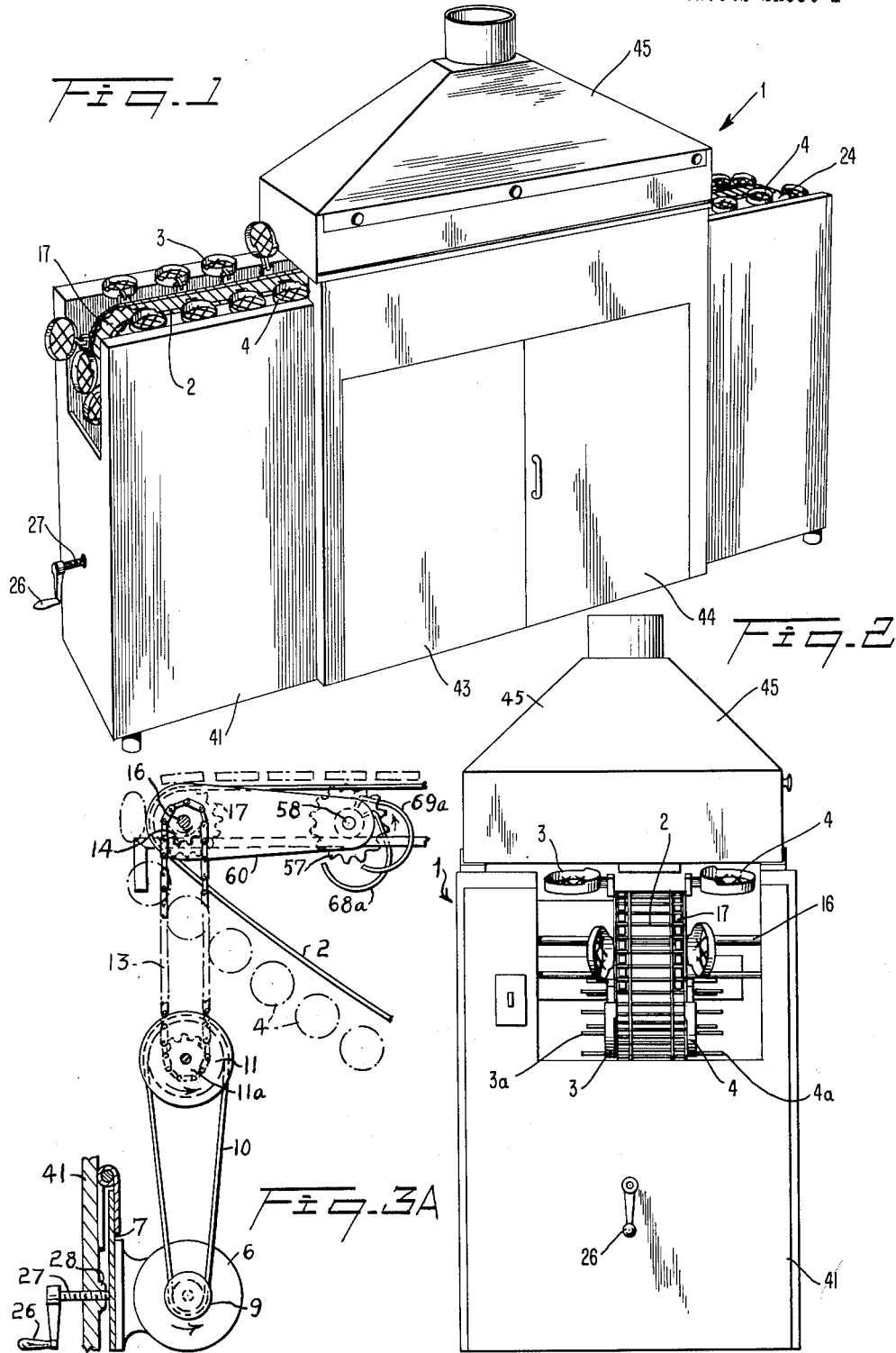

Feb. 6, 1962 T. CARVEL 3,019,744
ASSEMBLY AND STACKING APPARATUS
Filed Feb. 20, 1961 5 Sheets-Sheet 3
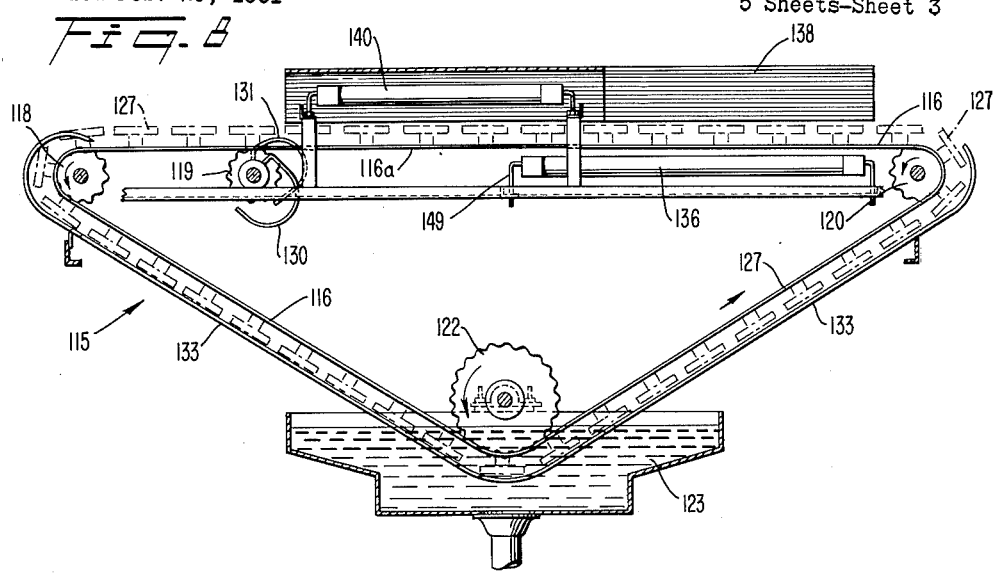
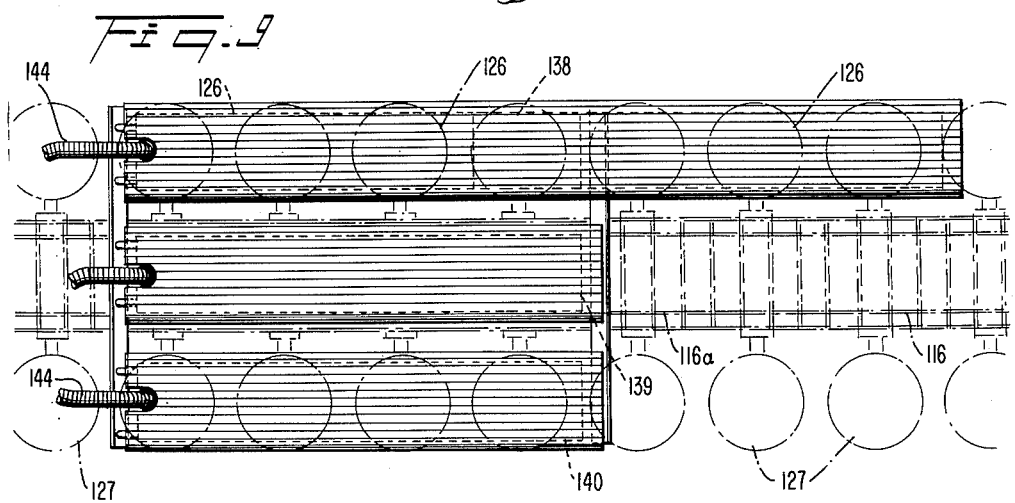
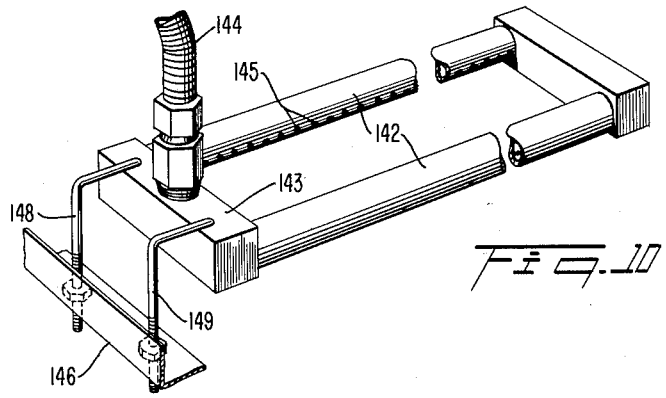

Feb. 6, 1962     T. CARVEL     3,019,744
ASSEMBLY AND STACKING APPARATUS
Filed Feb. 20, 1961     5 Sheets-Sheet 4
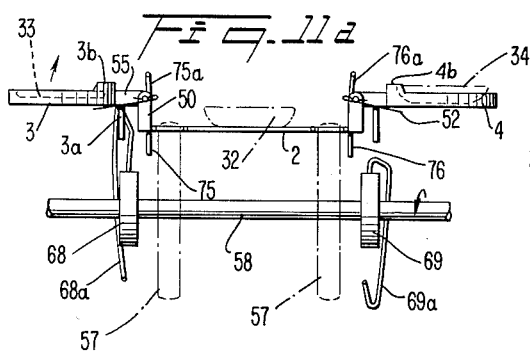
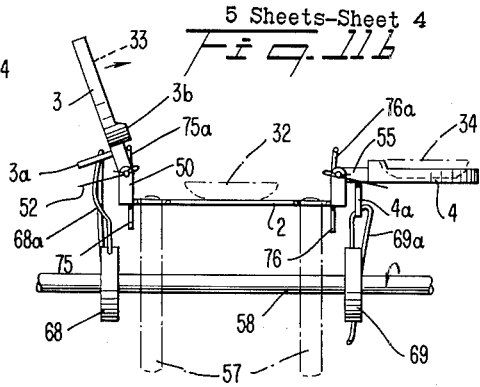
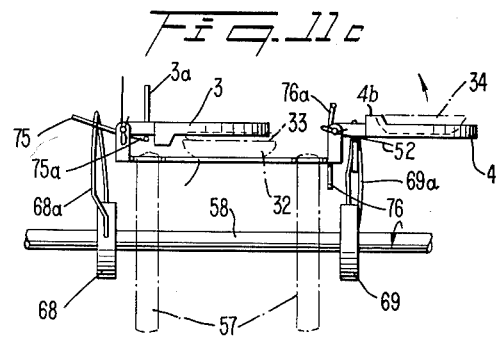
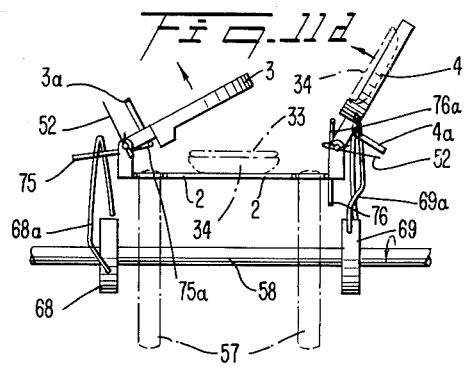
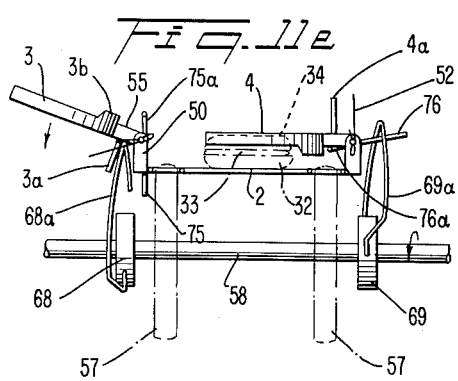
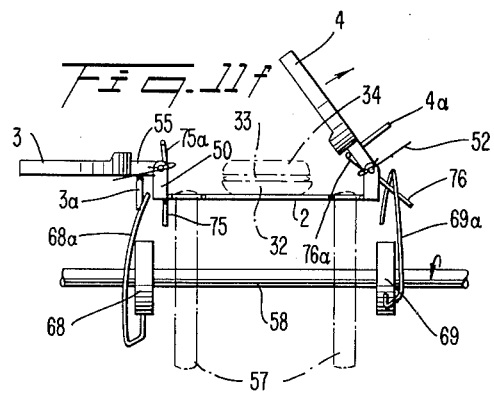
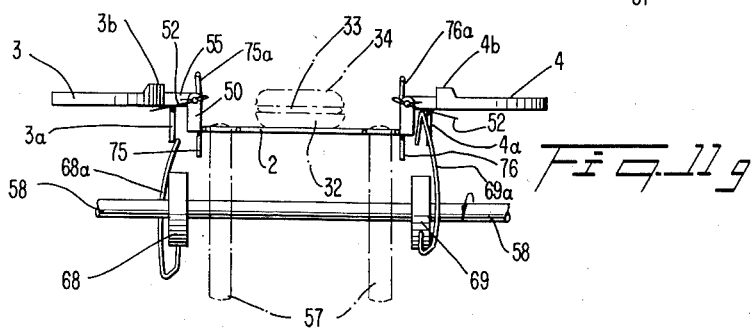

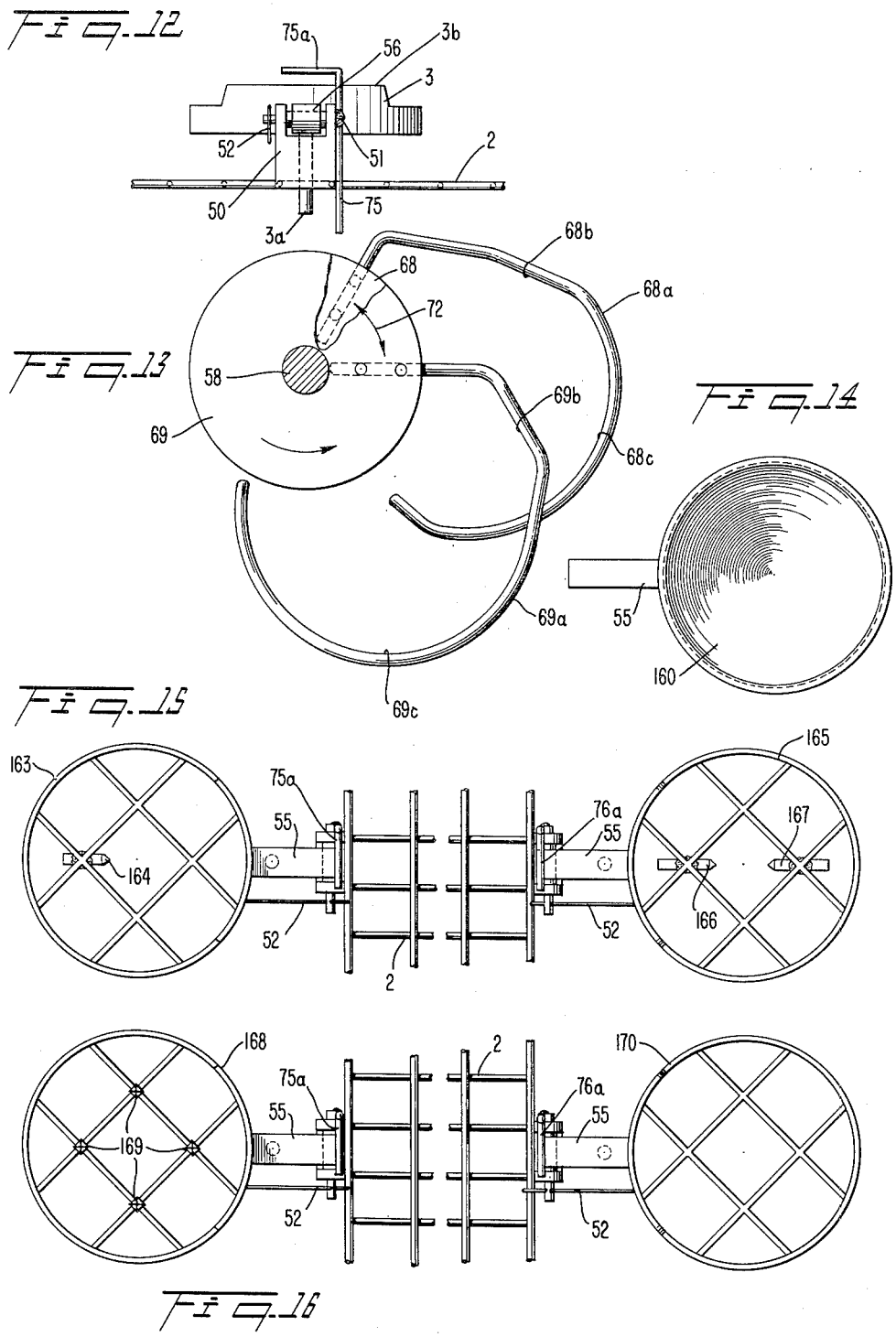

United States Patent Office 3,019,744
Patented Feb. 6, 1962

3,019,744
ASSEMBLY AND STACKING APPARATUS
Thomas Carvel, Winding Farm Road, Chauncey, N.Y.
Filed Feb. 20, 1961, Ser. No. 90,415
15 Claims. (Cl. 107—1)

This is a continuation-in-part of my application, Serial No. 11,193, filed February 26, 1960, now abandoned.

This invention relates generally to automatic assembling apparatus and more particularly to apparatus for assembling articles of manufacture in sandwich combinations.

While automatic machines for assembling articles of manufacture in stacked relationship are known, for example vending and cooking apparatus capable of assembling sandwiches, hot dogs and the like, such known apparatus are not constructed for continuous production assembling operations and moreover are generally quite complex in their structure.

It is a principal object of the present invention to provide an automatic machine whose principles are usable in assembling various articles of manufacture into stacked relationship for example, sandwich formations or combinations and more particularly applicable to food cooking and assembling of preformed food into sandwich combinations.

Another object of the present invention is to provide a simple mechanical arrangement by which food assembly operations take place during a cooking cycle in timed relationship therewith and by use of a simple assembly mechanism providing for continuous operation of the machine or apparatus for automatically carrying out sandwich-forming operations.

A feature of the apparatus according to the invention is the provision of an endless driven conveyor for receiving individual articles of manufacture, for example pieces of food, comprising slices of bread, or halves thereof in roll and bun forms and transporting them in spaced positions along a given path of travel while at the same time at least heating the slices of bread or roll or bun halves and preferably toasting them. The apparatus is provided with a plurality of groups of pivotally mounted carriers operable individually to a position for receiving and holding individual respective slices or preformed portions of food filling and respective individual slices of bread or roll halves which are assembled in sandwiched relationship with the slices or roll halves on the conveyor means. The carriers are up-ended or pivotally operated to a position for carrying out the sandwich forming operation by successive operation of the carriers within the respective groups and alternate operation between the groups to carry out the disposing of the articles of manufacture such as slices and the food filling in proper assembled relationship to form the finished desired sandwich combination.

The apparatus is provided with heating elements disposed in suitable positions with respect to the conveyor means and carriers, which are transported along parallel paths of the conveyor means, to carry out at least heating of the slices and food filling and preferably the heating cycle is so controlled that the bread or bun slices or halves are toasted while the food is cooked during continuous operation of the driven endless conveyor means.

Other features and advantages of the apparatus in accordance with the present invention will be better understood as described in the following specification and appended claims, in conjunction with the following drawings, in which:

FIG. 1 is a perspective view of an apparatus according to the invention and is illustrative of the manner in which the apparatus is housed and hooded;

FIG. 2 is an end view of the apparatus shown in FIG. 1;

FIG. 3 is a diagrammatic elevation view of an electrically heated unit or apparatus according to the invention;

FIG. 3A is a fragmentary diagrammatic view of a variable speed drive of the apparatus illustrated in FIG. 3;

FIG. 4 is a fragmentary plan view of the apparatus shown in FIG. 3 and is illustrative of the manner in which electrical heating elements are disposed with respect to the conveyor means and carriers according to the invention;

FIG. 5 is a plan view of shield and radiation reflector arrangement for the heating elements usable on the apparatus shown in FIG. 3 and is illustrative of the manner in which the reflectors are configured and positioned relative one another to carry out a reflection and shielding function according to the invention;

FIG. 6 is an enlarged detail fragmentary side view illustrating adjustable connections of removable heating or cooking elements shown in FIG. 3;

FIG. 7 is an enlarged fragmentary side view illustrating height adjustment connection means for the removable lower heating elements for the apparatus shown in FIG. 3;

FIG. 8 is a diagrammatic elevation view of another embodiment of the invention and is illustrative of a gas heated apparatus according to the invention;

FIG. 9 is a plan view of the apparatus shown in FIG. 9 and is illustrative of the position of the gas heating or burner elements;

FIG. 10 is an enlarged fragmentary perspective view illustrating removable gas burners shown in FIG. 9;

FIGS. 11a–11g are fragmentary elevation views illustrating the operation of carriers or grills according to the invention and the manner in which they are operationally sequenced to carry out an assembly or stacking function according to the invention;

FIG. 12 is a fragmentary elevation view of a pivotal mount for an individual carrier of the apparatus according to the invention;

FIG. 13 is an enlarged elevation view of a cam arrangement for pivotally operating carriers in timed relationship as illustrated in FIGS. 11a–11g;

FIG. 14 is a plan view of a pan-type carrier according to the invention;

FIG. 15 is a plan view of another type of carrier or grill according to the invention;

FIG. 16 is a plan view of another embodiment of carriers or grills according to the invention.

Apparatus according to the invention is usable to position articles of manufacture in a stacked relationship or sandwich combination. The apparatus is applicable to machines where at least three articles of manufacture are to be stacked in a sandwich combination. Preferably the apparatus is usable as food assembly apparatus.

While the apparatus according to the invention will be shown and described as applicable to automatic roll or bun toasting and cooking of hamburger filling and assembly thereof in sandwiched relationship it will be understood that the principles of the invention are applicable to assembly of slices of bread, in whatever form for example halves of rolls and buns with a food filling, for example, sandwich meat which must first be cooked. Moreover, sandwich making can be carried out by apparatus according to the invention without cooking or heating or toasting of the bread and filling.

A preferred embodiment of the invention is illustrated according to the drawings as applicable to automatic cooking of hamburger patties and the toasting of rolls and assembly thereof into sandwiched relationship. Referring to the drawings and more particularly FIGS. 1–4 an apparatus 1 according to the invention comprises an endless conveyor 2 having an upper run 2a driven along a predetermined substantially horizontal path. The conveyor is provided with a first group of carriers 3 fixed thereon for traveling a parallel path with the conveyor and a second group of carriers 4 disposed substantially opposite the carriers or grills 3 and fixed in a similar manner to travel substantially parallel to the path traveled by the conveyor 2 and at the same speed as the conveyor. The carriers are operable in a manner hereafter described to carry out an inverting and stacking operation of articles of manufacture and in the example illustrated are constructed in the form of pivotally mounted grills.

The conveyor 2 is driven by a variable speed drive operable as hereafter described. The drive comprises an electric motor 6 mounted on a pivoted mount 7 for actuating a split pulley 9 over which a belt 10 passes for driving a pulley 11. This pulley is provided with a sprocket 11a which drives a chain 13 cooperative with a sprocket 14 which drives a shaft 16 at variable speeds in a counterclockwise direction. The shaft 16 has thereon a pair of axially spaced drive sprockets 17 for rotatably variably driving the conveyor 2 and the carriers or grills thereon in a counterclockwise direction.

The conveyor 2 is guided over a pair of guide sprockets 19 rotatably mounted and axially spaced on a rotatable shaft 21. The shaft 21 is mounted in the frame of the machine, not shown, and the sprockets are dimensioned and positioned to cause the conveyor 2 and the carriers 4 to travel through a bath 23 for a purpose hereinafter described. A second pair of guide sprockets 24 mounted on a rotatable shaft 25 are so positioned relative to the drive sprockets 17 that the path of travel of the upper run 2a of the conveyor is along a substantially horizontal path.

The speed of the conveyor 2 can be varied at will by rotating a crank 26 fixed on a threaded shaft 27 which passes through the threaded stationary nut or collar 28. The crank shaft is connected to the pivotally mounted motor mount 7, which permits variation of the split-pulley belt drive 9, which drives the shaft 16, through the belt 10, the pulley 11 and chain 13. When the crank is rotated in a direction for swinging the mount 7 away from the position shown in FIG. 3A the speed is increased and when rotated in an opposite direction toward the position illustrated speed is decreased. Split-pulley drives are well known, and the split pulley is, therefore, not illustrated in detail.

In operation the apparatus is loaded, FIGS. 3 and 11a–11g, by loading, in the vicinity of the sprockets 24, articles of manufacture, for example halves 32 of slit rolls on the upper run 2a of the driven conveyor with the sliced surfaces disposed upwardly. The slit roll halves 32 are disposed in spaced positions between oppositely disposed carriers and are transported along the horizontal path of travel of the conveyor run 2a. The carriers 3 are each loaded with respective portions of food filling, for example, hamburger patties 33 to be assembled in sandwiched relationship with respective ones of other slices of bread or roll halves 34 each loaded on respective carriers 4, with the sliced surface disposed upwardly. The roll halves and meat portions or patties 33 are loaded in a loading zone at an input end of the conveyor adjacent the rotary shaft 25.

A plurality of electrical heating or cooking elements 35 are disposed, FIGS. 3–7, in position over the path traveled by the meat or filling holding grills or carriers 3. A second plurality of meat cooking and heating elements 36 are disposed underneath the path traveled by the food carriers 3 to cook the hamburger patties in the individual meat carriers. The roll halves 32, 34 have only the upper sides thereof heated and preferably toasted by respective pairs of heating elements 38, 39 which are disposed in position overlying the path traveled by the upper run 2a and carriers 4 respectively. It is to be understood that the length of the heating elements and the heat applied therefrom must be sufficient to allow cooking and toasting for the maximum speed at which the conveyor 2 travels.

The entire mechanism heretofore described is enclosed in a housing 41 made of sheet metal panels in the manner shown in FIG. 1. The enclosure or housing 41 is provided with a pair of doors 43, 44 providing access to the bath 23. A hood 45 is removably mounted on the housing 41 over the heating elements 35, 38, 39 to lead away cooking fumes and odors.

The roll halves or slices of bread 32, 34 are assembled in sandwiched relationship with the fillings or patties 33 disposed therebetween after the respective roll halves and filling which are to be assembled are clear of the heating elements and externally of the hood 45 in the manner shown in FIGS. 1, 3 and 11a to 11g. The carriers 3 and 4 are pivotally mounted, FIG. 12, on respective upstanding, bifurcated mount members 50 fixed to the conveyor 2 and in which is mounted a pivot pin 51 held in axial position by a cotter pin 52. The individual carriers 3, 4 are provided with a radial extension 55 pivotally mounted on the mounts 50 by the pivot pins 51. The radially extending extensions or arms 55 are each constructed so that their free end rests on the bifurcated portion of the mounts 50, as illustrated in FIG. 12, when the carriers are being transported on the horizontal run of the conveyor so that the carriers or grills travel disposed in a horizontal position during horizontal travel of the conveyor. The carriers are preferably made of a light metal, for example aluminum, and accordingly a brass bearing 56 is provided for allowing easy pivot movement of the individual carriers 3, 4.

In order to carry out assembly of the sandwich relationship between the slices 32, 34 and filling 33 the apparatus is provided with a second pair of drive sprockets 57 fixed axially spaced on a shaft 58 driven in a counterclockwise direction from the shaft 16 by means of a mechanism or drive, not shown, covered by a guard 60. A pair of cams comprising collars 68, 69 are fixed relative to the shaft 57 for angular rotation therewith. The cams each comprise a formed wire 68a, 69a for pivotally operating or tipping the carriers 3 and 4 respectively as hereafter explained.

Each carrier is provided with a downwardly depending extension or finger 3a, 4a which is engaged by a relatively flat camming surface 68b, 69b of the respective operating or tipping cams in the manner shown in FIGS. 11a and 11b which initiate the rotation of the respective carriers and in a direction toward the conveyor 2 for carrying out the assembly of the slices and food or meat filling in a sandwich combination. The angular rotation of the individual carriers is continued and completed by the respective arcuate portions 68c, 69c of the wire cams 68a, 69a which are configured to move the carriers past a vertical position. In order to carry out the up-ending or tipping operation for assembling the components of the sandwich combination in proper sequence the wires 68a, 69a are inserted in their respective collars 68, 69 angularly spaced in the manner shown in FIG. 13 through an angle 72 so chosen as to permit sequential and alternate operation of the carriers 3, 4 of the respective groups. A carrier 3 is first rotated to an inverted position to dispose the meat patty it is transporting onto a roll half 32 after the patty is cooked and the upper side of the roll half 32 is toasted. The carrier 3 is restored to a horizontal position as hereafter explained. Next a carrier 4 oppositely disposed to the carrier 3 is inverted to dispose the roll half 34 it is transporting overlying the patty just deposited.

In order to preclude the carriers from simply flopping over each carrier is provided with an angle wire operating member 75 or 76 also operable to restore its respective carrier to its original horizontal position. The members 75, 76 are fixed to the pins 51 and have a portion 75a, 76a engageable by the respective extensions 55 of the carriers as shown in FIGS. 11c and 11e thus rotating the members 75, 76 so that they engage the underside of the cam wires 68a, 69a and controllably lower the respective carriers to the inverted positions. The wires 75, 76 respectively are engaged by the underside of the arcuate cam portions 68c, 69c. The cam portions are arcuate and spaced radially relative to their respective collars and are bent inwardly toward the conveyor to rotate the operating members 75 and 76 counterclockwise and clockwise respectively thereby to rotate the carriers in a respective direction to restore them back to their original horizontal position shown in FIG. 11a. It is readily apparent the restoration of the patty-carrying carriers is begun while the upending of the opposite carriers is beginning as shown in FIG. 11d, whereby the assembly of the sandwich combination is quickly completed. The assembled sandwich combination or formation is then either taken manually from the conveyor or otherwise delivered to a chute, not shown, disposed to receive the sandwich combination when the conveyor reaches the end of its horizontal travel and the sandwich combination is delivered to a consumer or otherwise wrapped for delivery. The tipping cams operate the carriers 3 successively and alternately with their oppositely disposed carriers 4 which are likewise successively operated.

In the electric embodiment of the invention the food carriers 3, 4 depend downwardly freely from their pins 51 in a vertical position from the conveyor during traveling of the conveyor on the lower runs thereof in the manner shown in FIG. 3. The carriers are returned to a level or horizontal position for receiving food or meat filling and bread or roll slices by a pair of arcuately formed restoration rods 88, of which one only is shown, disposed at the end of the lower run of the conveyor, for restoring the carriers 4. The other rod, not shown, is disposed opposite to the rod shown to restore the carriers 3 to a horizontal or level position. These rods engage the downwardly depending fingers 3a, 4a of the respective group or row of carriers and are formed to cam the fingers rotationally in opposite directions thereby causing the carriers to rotate into their ready position for receiving filling or roll halves thereon in a level position as shown in FIG. 3.

The electrically heated apparatus according to the invention has the heating elements 35 positionable adjustably in a vertical direction variably by vertical adjustment of support members 90 on which the individual elements 35 are suspended. The support members 90 are variably adjusted in height by threaded hangers 91 mounted on the frame 92. In order to permit adjustable movement of the electrical connections to the heating elements 35 both ends of the elements are provided with free fit couplings 94 electrically connected to, buses or conductors, not shown, housed in end housings 95 through which electrical current is applied from a power source, for example a 220 volt source, not shown. In a similar manner the lower cooking elements 36 are mounted on mounts or support members 96 variably adjusted in height by threaded members 97 mounted on the frame members 98 of the machine. The upward and downward movement of the lower cooking coils is permitted by free fit couplings 101 electrically connected to the conductors, not shown, enclosed in end housing 102. It is readily apparent the manner of suspending the heating or cooking elements on threaded hangers and the use of threaded free fit couplings allows easy removal of the elements from the machine for cleaning or repair. The ease of adjustment permits heat adjustment as well as cleaning space without removal of the elements. The other elements 38, 39 are similarly removably and adjustably suspended in the apparatus.

In order to accelerate the cooking and heating effect of the electrical heating elements and to improve the efficiency of the apparatus it is provided with a system of reflectors for cooking by reflected radiant energy. The reflector system comprises a series of panels 103 removably mounted on framing members 105, 106 fixed to the electrical conductor cover shield or housings 95. It being understood that the reflectors are disposed in position to receive the radiant energy from the heating elements and reflect it toward the carriers. The reflector system is disposed above the heating elements 35 and 36 respectively and above the long spans of the heating elements 38, 39 to direct the heat downwardly onto the carriers.

A second embodiment of the present invention illustrated as a gas fired apparatus 115 is shown in FIGS. 8 to 10. In this unit a conveyor 116 is driven at variable speeds by pairs of drive sprockets 118, 119 from a motor and variable speed drive, not shown, in a similar manner to the electric unit heretofore described. The conveyor has an upper run 116a guided over the pair of sprockets 118 and a pair of end guide sprockets 120. A pair of guide sprockets 122 disposed at the apex of a triangle formed by the guide sprockets causes the conveyor 116 to pass through a bath 123 along with two rows or groups of aligned carriers 126, 127 thereon. The carriers are pivotally mounted on the conveyor and travel along separate, substantial parallel paths with the conveyor in the manner described with respect to the electric unit.

The carriers 126, 127 are pivotally operated or tipped within each group successively and alternately within the groups as heretofore described by wire cams 130, 131 driven and constructed similarly to the cam wires 68a, 69a of the electric unit. In this embodiment the carriers or grills are constructed to pivotally operate for carrying an assembly function of bread slices or roll halves and a food or meat filling, however, the carriers do not depend downwardly on the lower runs of the conveyor 116 in the manner of the carriers on the electric unit. A pair of guides 133 keep the respective rows of carriers from depending vertically downwardly on the lower runs of the conveyor in the manner of the carriers illustrated in FIG. 8. In this embodiment the carriers travel in the same position relative to the conveyor during travel on the upper and lower runs.

It has been found that in gas operated units of the invention if burners are placed on opposite sides of the meat carriers 126 the gas burners tend to operate inefficiently. This is believed to be due to the fact that one of the burners will consume most of the oxygen supply and the other one, therefore, will operate inefficiently so that the cooking on both sides of the food or meat filling is not uniform during the cooking cycle as the carriers move along with the conveyor 116. Preferably a lower burner arrangement 136 is arranged so that the carriers 126 pass over these lower burners and an upper burner arrangement 138 is spaced from the burner 136 in what may be considered a downstream position so that the opposite side of the fool filling on the carriers 126 is cooked. Thus both sides are cooked during the cycle of the machine. A burner arrangement 139 is provided for at least heating and preferably toasting the slices disposed on the upper runner span 116a of the conveyor 116 and a burner arrangement 140 is disposed over the path of the food carriers 127 for heating or otherwise toasting the other half of the bread or bun carried by the food carriers 127.

The individual burner arrangements are constructed as a plurality of burners 142 connected to a manifold 143 through which a flexible gas supply connection 144 is made. The burners are provided with a plurality of apertures 145. The manifold 143 is adjustably, removably mounted on a frame member 146 of the machine by angular threaded brackets 148, 149 so that the burners can be readily removed for cleaning of the apparatus and their position relative to the path of the grills can be adjusted.

The gas burners are supplied alternately with natural or synthetic gas depending upon which is available. It is readily apparent to those skilled in the art that the type of gas employed is simply a matter of orifice size for control of gas delivery to the supply connection or hose 144. Natural gas simply requires a larger orifice.

Moreover, the burners are provided with reflector elements, not shown.

The gas unit 115 is preferably provided, as heretofore mentioned, with variable speed changing means, not shown, in a manner described with respect to the electric unit. It is to be understood that in both embodiments of the invention the assembly of the slices and filling is always maintained in synchronism with the speed of the conveyor since the actuating or flipping cams in both embodiments are driven in synchronism with the conveyor and the food carriers when transported at the variable speeds are driven at the speed of the conveyors since in both embodiments they are mounted directly on the conveyors.

The speed of the conveyors is variably changed in dependence upon the food filling to be cooked and whether it is fresh or frozen so that the apparatus is quite versatile. Moreover, the heat delivered by the electric elements or gas burners can be varied for example by rheostatic control means on the electric elements, not shown, and by valve adjustments, not shown, in the gas burner supplies thereby providing for adjustment of the cooking cycle in conjunction with the position of the elements or burners relative to the grills as they move along their paths and the transport speed of the slices and filling. The machine can, therefore, operate at a considerable variable range of speeds and in which the various mechanisms and time intervals of the cycle are always kept in synchronism by virtue of the construction of the apparatus.

A preferred embodiment of the carriers has been shown and described wherein the carriers 3, 4 are provided with a lip 3b, 4b for holding the meat patties and roll halves as slices therein during the up-ending and inverting of the carriers or grills. The carriers or grills can be constructed in different ways illustrated in FIGS. 14–16. Thus, the carriers may comprise a grill on which is disposed a removable pan 160 made of a heat conductive material, for example aluminum. Alternatively the carriers or grills are constructed to releasably hold a slice of food for example bread or a roll. For this purpose a carrier or grill 163 is provided with an upstanding prong 164 welded to a grid forming the base of the carrier while an oppositely disposed cooking grill or carrier 165 is provided with a pair of prongs 166, 167. The carriers may be constructed in the manner shown in FIG. 16 wherein a carrier 168 is provided with fixed upstanding prongs 169 while an oppositely disposed food carrier 170 is simply constructed as a plain circular grill.

It is readily apparent that the transport mechanism and pivotally operable carriers operable by tipping cams according to the invention are usable in apparatus usable to stack articles in a sandwich formation. The cooking elements are only necessary when the invention is applied to apparatus for cooking and assembling sandwich combinations in which the preformed food filling is to be cooked, for example, in automatically making hamburgers that make use of preformed patties. Moreover, the baths 23, 123 are filled with a bath suitable for the use to which the apparatus is being applied. In the examples of the invention shown and described as applied to an automatic hamburger cooking and toasting machine the baths comprise a fluid for suitably cleaning the carriers or grills.

While preferred embodiments of the invention have been shown and described, it will be understood that many modifications and changes can be made within the true spirit and scope of the invention.

What I claim and desire to secure by Letters Patent is:

1. In an assembly apparatus, in combination, driven conveyor means for receiving individual articles of manufacture and in operation transporting them in respective spaced positions along a given path of travel, a first group of pivotally mounted carriers operable individually to a first position for receiving and holding individual, respective articles of manufacture and pivotally operable individually to a second position for disposing the second mentioned articles individually overlying respective ones of the first-mentioned articles, a second group of pivotally mounted carriers individually operable to a first position for receiving and holding respective individual articles of manufacture and pivotally operable to a second position for disposing the respective articles of manufacture thereon overlying respective ones of said second-mentioned articles to form a sandwich combination, means cooperative with said conveyor means to move the first and second group of carriers along separate paths substantially parallel to the path of travel of said conveyor means and in synchronism therewith, and means spaced from a zone in which said carriers and conveyor means receive said articles of manufacture and spaced therefrom in the direction of travel of said conveyor means operable automatically cyclically in timed relationship with the speed of said conveyor means to automatically angularly rotate and pivotally operate the carriers of said first group successively to said second position and including means to pivotally operate the carriers of said second group successively to said second position and alternately with the individual carriers of said first group in timed sequence to dispose the second-mentioned articles on respective ones of the first-mentioned articles on said conveyor means and respective ones of the third-mentioned articles carried on said second group of carriers in position overlying respective ones of the second-mentioned articles to form said sandwich combination, and means operable automatically to restore each of the carriers automatically to said first positions subsequent to their operation to their second positions thereby to position them in readiness for receiving said respective articles.

2. In an assembly apparatus, in combination, driven conveyor means for receiving individual articles of manufacture and in operation transporting them in respective spaced positions along a given path of travel, a first group of pivotally mounted carriers operable individually to a first position for receiving and holding individual, respective articles of manufacture and pivotally operable individually to a second position for disposing the second mentioned articles individually overlying respective ones of the first-mentioned articles, a second group of pivotally mounted carriers individually operable to a first position for receiving and holding respective individual articles of manufacture and pivotally operable to a second position for disposing the respective articles of manufacture thereon overlying respective ones of said second-mentioned articles to form a sandwich combination, means cooperative with said conveyor means to move the first and second group of carriers along separate paths substantially parallel to the path of travel of said conveyor means and in synchronism therewith, and means spaced from a zone in which said carriers and conveyor means receive said articles of manufacture and spaced therefrom in the direction of travel of said conveyor means operable automatically cyclically in timed relationship with the speed of said conveyor means to automatically angularly rotate and pivotally operate the carriers of said first group successively to said second position and including means to pivotally operate the carriers of said second group successively to said second position and alternately with the individual carriers of said first group in timed sequence to dispose the second-mentioned articles on respective ones of the first-mentioned articles on said conveyor means and respective ones of the third-mentioned articles carried on said second group of carriers in position overlying respective ones of the second-mentioned articles to form said sandwich combination, means to automatically clean said carriers alternately while the conveyor means is stopped or driven, and means operable automatically to restore each of the carriers automatically to said first positions subsequent to their operation to their second positions thereby to position them in readiness for receiving said respective articles.

3. Assembly apparatus according to claim 2, in which said means to clean said carriers comprises a cleaning bath through which said carriers are transported, and in which said means to restore the carriers to their first positions are disposed to carry out restoration subsequent to the carriers passing through said bath.

4. In a food assembly apparatus, in combination, driven conveyor means for receiving individual pieces of an article of food and in operation transporting them in spaced positions along a given path of travel, a first group of pivotally mounted carriers each operable to a first position for receiving and holding individual, respective portions of food filling and pivotally operable individually to a second position for disposing the food filling portions overlying respective ones of the first-mentioned pieces, a second group of pivotally mounted carriers each operable to a first position for receiving and holding respective individual pieces of an article of food and pivotally operable to a second position for disposing the respective pieces of food thereon overlying respective ones of said food filling portions to form a sandwich combination, means to move the first and second group of carriers along paths substantially parallel to the path of travel of said conveyor means and in synchronism therewith, and means cooperative with said conveyor means spaced from a zone in which said carriers and conveyor means receive said pieces of food and food filling portions and spaced therefrom in the direction of travel of said conveyor means operable automatically, cyclically to angularly rotate and pivotally operate the carriers of said first group successively to said second position and including means to pivotally operate the carriers of said second group successively to said second position and alternately with the individual carriers of said first group in timed sequence to dispose the food filling portions on respective ones of the first-mentioned slices on said conveyor means and respective ones of the second-mentioned pieces carried on said second group of carriers in position overlying respective food filling portions to form said sandwich combination, and means operable automatically to restore each of the carriers automatically to said first positions subsequent to their operation to their second positions thereby to position them in readiness for receiving said respective articles.

5. In a food assembly apparatus, in combination, driven conveyor means for receiving individual pieces of an article of food and transporting them in spaced positions along a given path of travel, a first group of pivotally mounted carriers each operable to a first position for receiving and holding individual, respective portions of food filling and pivotally operable individually to a second position for disposing the food filling portions overlying respective ones of the first-mentioned pieces, a second group of pivotally mounted carriers each operable to a first position for receiving and holding respective individual pieces of an article of food and pivotally operable to a second position for disposing the respective pieces of food thereon overlying respective ones of said filling portions to form a sandwich combination, means to move the first and second group of carriers along paths substantially parallel to the path of travel of said conveyor means and in synchronism therewith, and means cooperative with said conveyor means spaced from a zone in which said carriers and conveyor means receive said piece of food and food filling portions and spaced therefrom in the direction of travel of said conveyor means operable automatically, cyclically to angularly rotate and pivotally operate the carriers of said first group successively to said second position and including means to pivotally operate the carriers of said second group successively to said second position and alternately with the individual carriers of said first group in timed sequence to dispose the food filling portions on respective ones of the first-mentioned slices on said conveyor means and respective ones of the second-mentioned pieces carried on said second group of carriers in position overlying respective food filling portions to form said sandwich combination, and said means to pivotally rotate and operate the carriers automatically including means operable automatically to restore each of the carriers automatically to said first positions subsequent to their operation to their second positions thereby to position them in readiness for receiving said respective articles.

6. In a food assembly apparatus according to claim 5, including means to cook said food portions during the travel of said driven conveyor means and prior to formation of said sandwich combination.

7. In a food assembly apparatus, in combination, driven means for receiving individual slices of bread and in operation transporting them in spaced positions along a given path of travel, a first group of pivotally mounted carriers operable individually to a first position for receiving and holding individual, respective portions of food filling and pivotally operably individually to a second position for inverting and disposing the filling portions overlying respective ones of the first-mentioned bread slices, a second group of pivotally mounted carriers individually operable to a first position for receiving and holding respective individual slices of bread and pivotally operable to a second position for inverting and disposing the respective slices of bread carried thereon overlying respective ones of said filling portions to form a sandwich formation, means to move the first and second group of food carriers along paths substantially parallel to the path of travel of said conveyor means and in synchronism therewith, and up-ending means spaced from a zone in which said carriers and driven means receive said bread slices and filling portions and spaced therefrom in the direction of travel of said driven means to automatically angularly rotate and pivotally operate the carriers of said first group successively and to pivotally operate the carriers of said second group successively alternately with the carriers of said first group in timed sequence to dispose the food filling portions on respective ones of the first-mentioned bread slices on the first-mentioned means and respective ones of the second-mentoned bread slices carried on said second group of carriers in position overlying respective food filling portions to form said sandwich combination.

8. In a food assembly apparatus, in combination, driven conveyor means for receiving individual slices of bread and in operation transporting them in spaced positions along a given path of travel, a first group of pivotally mounted carriers operable individually to a first position for receiving and holding individual, respective portions of food filling and pivotally operable individually to an operative position for inverting and disposing the filling portions overlying respective ones of the first-mentioned bread slices, a second group of pivotally mounted carriers individually operable to a position for receiving and holding respective individual slices of bread and pivotally operable to an operative position for inverting and disposing the respective slices of bread overlying respective ones of said filling portions to form a sandwich combination, means to move the first and second group of carriers along separate paths substantially parallel to the path of travel of said conveyor means and in synchronism therewith, and means operable automatically in timed relationship with the speed of travel of said conveyor means to automatically angularly rotate and pivotally operate the carriers of said first group successively and including means to pivotally operate the carriers of said second group successively and alternately with the carriers of said first group in timed sequence to dispose the food filling portions on respective ones of the first-mentioned bread slices on said conveyor means and respective ones of the second-mentioned bread slices overlying respective food filling portions to form said sandwich combination, means disposed to at least heat a preselected side of each of said bread slices during travel of said conveyor means and respective carriers prior to formation and assembly of said sandwich combination, means disposed adjacent the path of travel of said first group of carriers to cook said filling portions during travel of said conveyor means and said second group of carriers, and means to variably change the speed of travel of said conveyor means along said given path.

9. In a food assembly apparatus, in combination, driven conveyor means for receiving individual slices of bread and in operation transporting them in respective spaced positions, along a given path of travel, a first group of pivotally mounted carriers operable individually to a position for receiving and holding individual, respective portions of food filling and pivotally operable individually to an operative position for inverting and disposing the filling portions overlying respective ones of the first-mentioned bread slices, a second group of pivotally mounted carriers individually operable to a position for receiving and holding respective individual slices of bread and pivotally operable to an operative position for inverting and disposing the respective slices of bread overlying respective ones of said filling portions to form a sandwich combination, means to move the first and second group of carriers along separate paths substantially parallel to the path of travel of said conveyor means and in synchronism therewith, and means operable automatically to automatically angularly rotate and pivotally operate the carriers of said first group successively and including means to pivotally operate the carriers of said second group successively and alternately with the carriers of said first group in timed sequence to dispose the food filling portions on respective ones of the first-mentioned bread slices on said conveyor means and respective ones of the second-mentioned bread slices overlying respective food filling portions to form said sandwich combination, means disposed to at least heat a preselected side of each of said bread slices during travel of said conveyor means and respective carriers prior to formation and assembly of said sandwich combination, and means disposed adjacent the path of travel of said first group of carriers to cook said filling portions during travel of said conveyor means and said second group of carriers.

10. In a food assembly apparatus, in combination, driven conveyor means for receiving individual slices of bread and in operation transporting them in spaced positions along a given path of travel, a first group of pivotally mounted carriers operable individually to a position for receiving and holding individual, respective portions of food filling and pivotally operable individually to an operative position for inverting and disposing the filling portions overlying respective ones of the first-mentioned bread slices, a second group of pivotally mounted carriers individually operable to a position for receiving and holding respective individual slices of bread and pivotally operable to an operative position for inverting and disposing the respective slices of bread overlying respective ones of said filling portions to form a sandwich combination, means to move the first and second group of carriers along separate paths substantially parallel to the path of travel of said conveyor means and in synchronism therewith, and means operable automatically in timed relationship with the speed of travel of said conveyor means to automatically angularly rotate and pivotally operate the carriers of said first group successively and including means to pivotally operate the carriers of said second group successively and alternately with the carriers of said first group in timed sequence to dispose the food filling portions on respective ones of the first-mentioned bread slices on said conveyor means and respective ones of the second-mentioned bread slices overlying respective food filling portions to form said sandwich combination, gas operated burner means disposed to at least heat a preselected side of each of said bread slices during travel of said conveyor means and respective carriers prior to formation and assembly of said sandwich combination, and other gas operated burner means disposed adjacent the path of travel of said first group of carriers to cook said filling portions during travel of said conveyor means and said second group of carriers.

11. In a food assembly apparatus, in combination, driven conveyor means for receiving individual slices of bread and in operation transporting them in spaced positions along a given path of travel, a first group of pivotally mounted carriers operable individually to a position for receiving and holding individual, respective portions of food filling and pivotally operable individually to an operative position for inverting and disposing the filling portions overlying respective ones of the first-mentioned bread slices, a second group of pivotally mounted carriers individually operable to a position for receiving and holding respective individual slices of bread and pivotally operable to an operative position for inverting and disposing the respective slices of bread overlying respective ones of said filling portions to form a sandwich combination, means to move the first and second group of carriers along separate paths substantially parallel to the path of travel of said conveyor means and in synchronism therewith, and means operable automatically in timed relationship with the speed of travel of said conveyor means to automatically angularly rotate and pivotally operate the carriers of said first group successively and including means to pivotally operate the carriers of said second group successively and alternately with the carriers of said first group in timed sequence to dispose the food filling portions on respective ones of the first-mentioned bread slices on said conveyor means and respective ones of the second-mentioned bread slices overlying respective food filling portions to form said sandwich combination, electrically energized means disposed to at least heat a preselected side of each of said bread slices during travel of said conveyor means and respective carriers prior to formation and assembly of said sandwich combination, and other electrically energized means disposed adjacent the path of travel of said first group of carriers to cook said filling portions during travel of said conveyor means and said second group of carriers.

12. In a food assembly apparatus, in combination, driven means for receiving individual halves of slit rolls of bread and in operation transporting them in spaced positions along a given path of travel, a first group of pivotally mounted grills operable individually to a first position for receiving and holding individual, respective preformed portions of meat and pivotally operable individually to a second position for inverting and disposing the meat portions overlying respective ones of the first-mentioned roll halves, a second group of pivotally mounted grills individually operable to a first position for receiving and holding respective individual halves of slit rolls of bread and pivotally operable to a second position for inverting and disposing the respective second-mentioned bread roll halves carried thereon overlying respective ones of said meat portions to form a sandwich formation, means to move the first and second group of grills along paths substantially parallel to the path of travel of said conveyor means and in synchronism therewith, and means operable automatically, cyclically in timed relationship with the speed of travel of said driven means spaced from a zone in which said grills and driven means receive said roll halves and meat portions and spaced therefrom in the direction of travel of said driven means to automatically angularly rotate and pivotally operate the grills of said first group successively and including means to pivotally operate the grills of said second group successively alternately with the grills of said first group in timed sequence to dispose the meat portions on respective ones of the first-mentioned roll halves on the first-mentioned means and respective ones of the second-mentioned roll halves carried on said second group of grills in position overlying respective meat portions to form said sandwich combination.

13. In a food assembly apparatus according to claim 12, means adjustably and removably mounted in the apparatus in position to at least heat a preselected side surface of each of said roll halves before assembly in said sandwich combination and during travel of said driven means and grills.

14. In a food assembly apparatus according to claim 13, including other means adjustably and removably mounted in said apparatus adjacent the path of travel of said first group of grills to cook said meat portions before assembly in said sandwich combination and during travel of said driven means and said first and second groups of grills.

15. In a food assembly apparatus according to claim 14, in which said apparatus includes means through which said grills travel for cleaning them.

References Cited in the file of this patent
UNITED STATES PATENTS

| | | |
|---|---|---|
| 2,027,002 | Spang | Jan. 7, 1936 |
| 2,260,832 | Deutscher | Oct. 28, 1941 |
| 2,565,174 | Fredenhagen | Aug. 21, 1951 |
| 2,718,188 | Read et al. | Sept. 20, 1955 |
| 2,728,286 | Ehrenberg | Dec. 27, 1955 |